(12) United States Patent
Carroll

(10) Patent No.: US 6,845,483 B1
(45) Date of Patent: Jan. 18, 2005

(54) SYSTEM AND METHOD FOR GENERATING ELECTRONIC DOCUMENTS HAVING INDEPENDENTLY FORMATTABLE REGIONS

(75) Inventor: Michael Carroll, Westford, MA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/422,976

(22) Filed: Oct. 22, 1999

Related U.S. Application Data

(60) Provisional application No. 60/112,191, filed on Dec. 15, 1998.

(51) Int. Cl.[7] ............................................. G06F 17/30
(52) U.S. Cl. ...................................... 715/513; 715/517
(58) Field of Search ................................ 715/513, 509, 715/521, 523, 517

(56) References Cited

U.S. PATENT DOCUMENTS

| | | |
|---|---|---|
| 2,496,606 A | 2/1950 | Smith |
| 4,710,885 A | 12/1987 | Litteken |
| 5,253,362 A | 10/1993 | Nolan et al. |
| 5,287,448 A | 2/1994 | Nicol et al. ................. 395/159 |
| 5,345,550 A | 9/1994 | Bloomfield ................. 395/156 |
| 5,428,733 A | 6/1995 | Carr ........................... 395/159 |
| 5,434,965 A | 7/1995 | Matheny et al. ............ 395/159 |
| 5,475,805 A | 12/1995 | Murata |
| 5,544,288 A | 8/1996 | Morgan et al. ............. 395/157 |
| 5,557,722 A | 9/1996 | DeRose et al. |
| 5,559,942 A | 9/1996 | Gough et al. ............... 395/155 |
| 5,596,700 A | 1/1997 | Darnell et al. |
| 5,602,997 A | 2/1997 | Carpenter et al. .......... 395/349 |
| 5,630,080 A | 5/1997 | Malamud et al. ........... 395/346 |
| 5,644,776 A | 7/1997 | DeRose et al. |
| 5,675,520 A | 10/1997 | Pitt, III et al. ............. 364/578 |
| 5,694,610 A | 12/1997 | Habib et al. ................ 395/793 |
| 5,742,768 A | 4/1998 | Gennaro et al. ........ 295/200.33 |
| 5,748,927 A | 5/1998 | Stein et al. .................. 395/333 |
| 5,778,404 A | 7/1998 | Capps et al. ................. 707/531 |
| 5,781,714 A | 7/1998 | Collins et al. |
| 5,802,388 A | 9/1998 | Zetts et al. .................. 398/804 |
| 5,805,167 A | 9/1998 | Van Cruyningen .......... 345/353 |
| 5,821,932 A | 10/1998 | Pittore ......................... 345/347 |
| 5,835,914 A | 11/1998 | Brim |
| 5,845,075 A | 12/1998 | Uhler et al. |
| 5,845,119 A | 12/1998 | Kozuka et al. |
| 5,860,073 A | 1/1999 | Ferrel et al. |
| 5,870,549 A | 2/1999 | Bobo, II |
| 5,870,768 A | 2/1999 | Hekmatpour ................ 707/501 |
| 5,874,962 A | 2/1999 | De Judicibus et al. ...... 345/342 |
| 5,937,417 A | 8/1999 | Nielsen |
| 6,041,335 A | 3/2000 | Merritt et al. |
| 6,073,136 A | 6/2000 | Bertram et al. |
| 6,092,081 A | 7/2000 | Alpert et al. |
| 6,128,655 A * | 10/2000 | Fields et al. ................. 709/219 |
| 6,209,006 B1 | 3/2001 | Medl et al. |
| 6,230,169 B1 | 5/2001 | Nagae |
| 6,230,170 B1 | 5/2001 | Zellweger et al. |
| 6,262,728 B1 | 7/2001 | Alexander |
| 6,681,368 B1 * | 1/2004 | Kawabata .................. 715/501.1 |

OTHER PUBLICATIONS

Internet Explorer 6.0 Help file © 2001 "Saving a Web Page on your computer".*
Young, Cascading Style Sheets in Internet Explorer 4.0 plus Examples, http://msdn.microsoft.com/library/default.asp?url=/library/en-us/dnie40/html/css-ie4.asp.*

(List continued on next page.)

Primary Examiner—Stephen S. Hong
Assistant Examiner—Adam Queler
(74) Attorney, Agent, or Firm—Pillsbury Winthrop LLP

(57) ABSTRACT

A system and method for generating a single electronic document having independently formatted regions. Different regions of a document are given attributes according to a set of region records, which are all contained within a single file. No assembly of separate HTML files as in the HTML standard is necessary. Users can customize documents to desired formats, without restriction.

29 Claims, 4 Drawing Sheets

OTHER PUBLICATIONS

Netscape Screen Shot, Netscape Communicator 4.03[fr], Copyright 1994–1997.*

Cascading Style Sheets, level 2, CSS2 Specification, W3C Recommendation May 12, 1998 http://www.w3.org/TR/REC–CSS2/css2.pdf.*

HTML 4.0 Specification, W3C Recommendation, revised on Apr. 24, 1998, http://www.w3.org/TR/1998/REC–html40–19980424/html40.pdf.*

"Cascading Style Sheets in Internet Explorer," 4 pgs. 1–24; http://www.microsoft.com/workshop/author/css/css–ie4.asp—Printed on Mar. 26, 1999.

"The Definitive Guide"—Chapter 10; pp. 1–13; http://www.ora.com/www/info/html/ch10.html—Printed on Mar. 26, 1999.

"Frames," pp. 1–3;http://www.iwaynet.net/ ~rtyler/htmltutorial/frames.html—Printed on Mar. 26, 1999.

"d ATA k ONCEPTS Advanced HTML–Frames!,"pp. 1–8; http://www.wave.co.nz/pages/dklynn/frames.html—Printed on Mar. 26, 1999.

"Introduction to Frames," pp. 1–12; http://www.w3.org/TR/REC–html40/present/frames.html—Printed on Mar. 26, 1999.

"HTML Tag Quick Reference Guide," pp. 1–5; http://www.projectcool.com/developer/reference/tag–table.html Printed on Mar. 26, 1999.

* cited by examiner

| Column 401 | Column 402 | Column 403 | |
|---|---|---|---|
| record | content | attribute | Row 410 |
| header | This is the header | bold, underline | Row 420 |
| body | This is the body | italic | Row 430 |

400

SYSTEM AND METHOD FOR GENERATING ELECTRONIC DOCUMENTS HAVING INDEPENDENTLY FORMATTABLE REGIONS

This application claims the benefit of U.S. Provisional Application No. 60/112,191 filed Dec. 15, 1998, the entire contents of which are incorporated herein by this reference.

FIELD OF THE INVENTION

The invention relates to documents having independently formattable regions. More particularly, the invention relates to structuring separate regions with selective attributes within a single document.

BACKGROUND OF THE INVENTION

The advent of the Internet and World Wide Web within the Internet has increased the demand for more sophisticated types of document presentation. For example, users sending and receiving information over the Internet or other network often expect to see a document having a number of different presentation styles in order to distinguish between different types of information. For example, a user viewing an HTML mail application may see a document divided into a header and a footer. Similarly, a person viewing a web site may see an upper column having advertising, a right row having a site index, and the remainder of the web site comprising the body of text.

As illustrated in FIGS. 1(a) to 1(c), present systems and methods require that a user create a plurality of documents in order to present a single document having independently formatted regions. FIG. 1(a) is the index file that provides the structure of the regions, while FIGS. 1(b) and 1(c) provide the content. Once the source code for each of these documents is transmitted to a terminal device, such as a computer with a web browser, a document is rendered having the appearance of the document in FIG. 2. Thus, portions of a conventional document are stored as separate HTML files which the system must assemble in the right sequence to prepare an email or other framed page, and changing or editing one of the HTML files does not automatically ensure that other fields will be properly conformed.

These and other drawbacks exist with other systems.

SUMMARY OF THE INVENTION

The invention overcoming these and other problems in the art relates to a system and method which generates freely programmable electronic documents having independent regions with their own attributes.

An object of the invention is to provide an system and method that generates a unified document having independent regions, while storing the entire document in a single file.

Another object of the invention is to provide a system and method that permits consistent editing of electronic documents, without the necessity to make corresponding edits through multiple files.

Another object of the invention is to provide a system and method which generates electronic documents having arbitrary sets of frames, fields or panes which can be adjusted according to user requirements.

According to one embodiment of the invention, the presentation of a document onscreen is governed by a document management file, containing records controlling all attributes of individual portions of the document. Using this unified file structure, a file can be decomposed into an arbitrary number or regions or frames, without resorting to individual descriptors stored in separate files. Email documents can, for instance, be broken down into as many regions as desired, each of which may be separately scrolled or otherwise processed.

DETAILED DESCRIPTION OF PREFERRED EMBODIMENTS

Figure 1A:
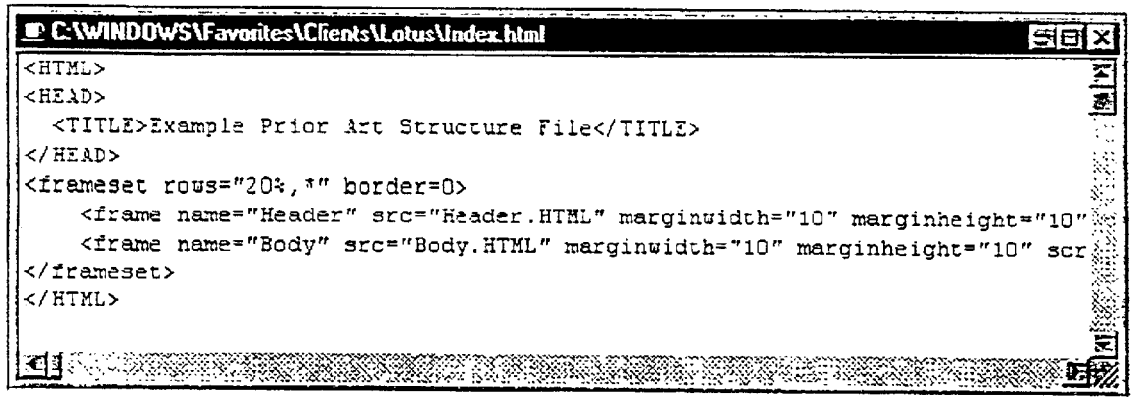
FIGS. 1(a) to 1(c) illustrate the implementation of regions using existing systems and methods.
Figure 1B:
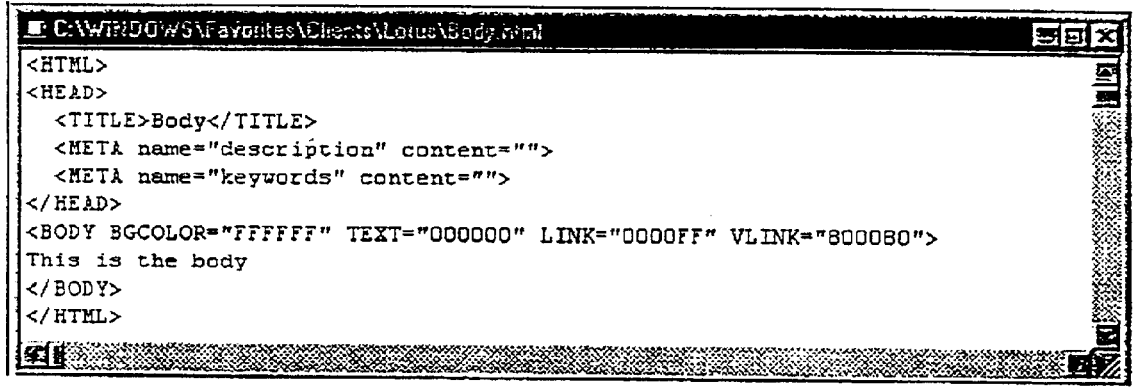
Figure 1C:
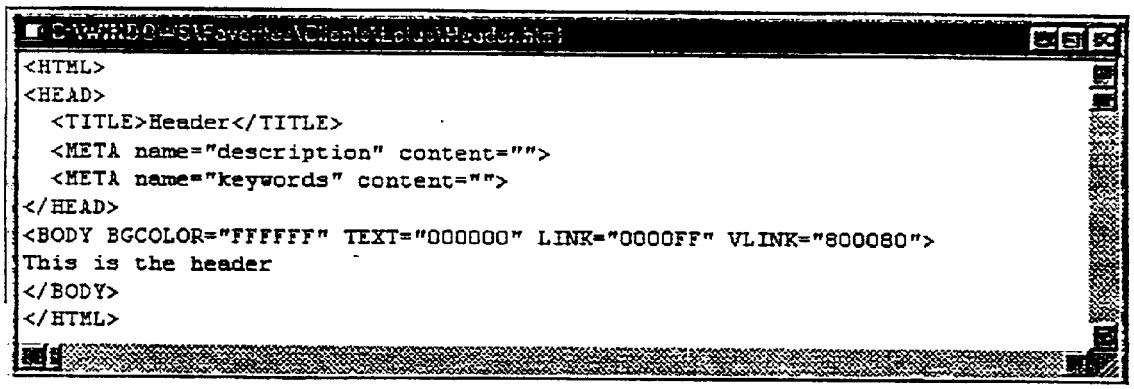
Figure 2:
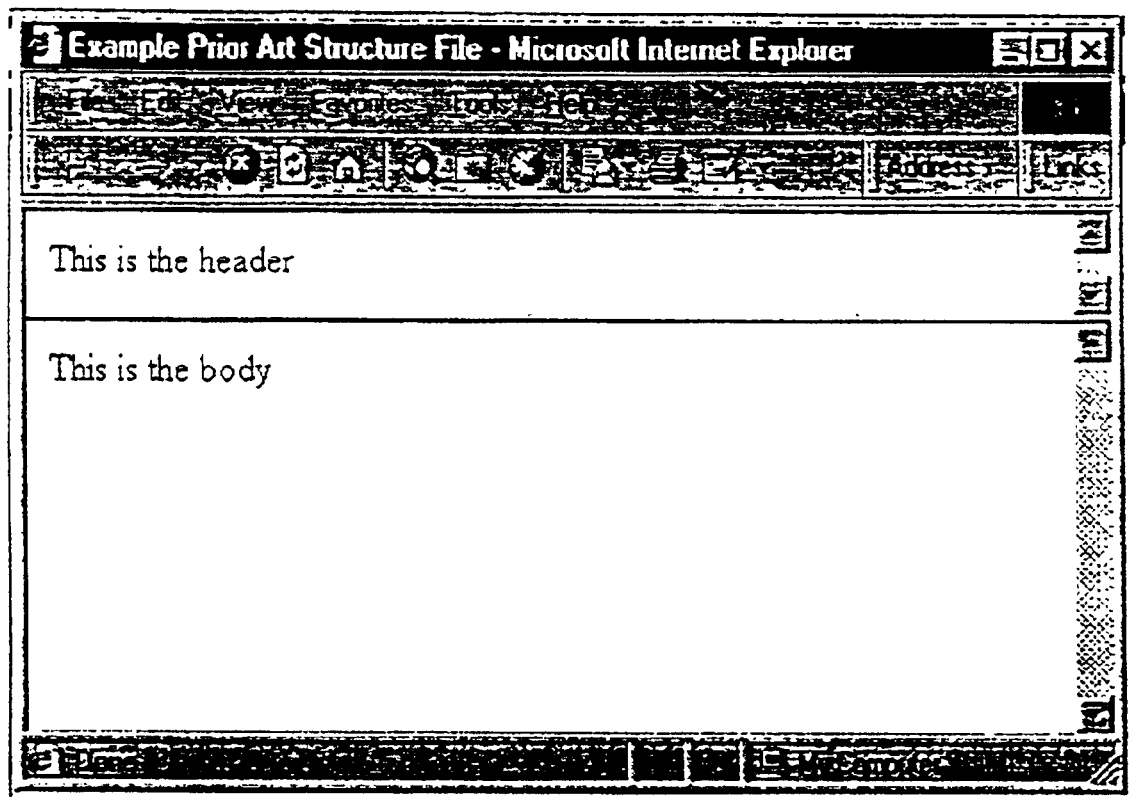
FIG. 2 is an illustration of a document rendered from the source code of FIGS. 1(a) to 1(c).

One embodiment of the invention relates to the presentation of an document in a mark-up language, such as HTML document as shown in FIG. 2. In FIG. 2, a document is provided having a header and a body section. The header and body section may have different formatting, different default attributes, or other different attributes.

It will be appreciated that other formats for document are contemplated by the invention, and that indeed free programmability of the document structure is an object of the invention. It will likewise be appreciated that the invention is intended to be operable with all types of electronic documents, including word processing files, email documents, Web-related pages, and in general any type of electronic formatting benefiting from improved formatting.

Figure 3:
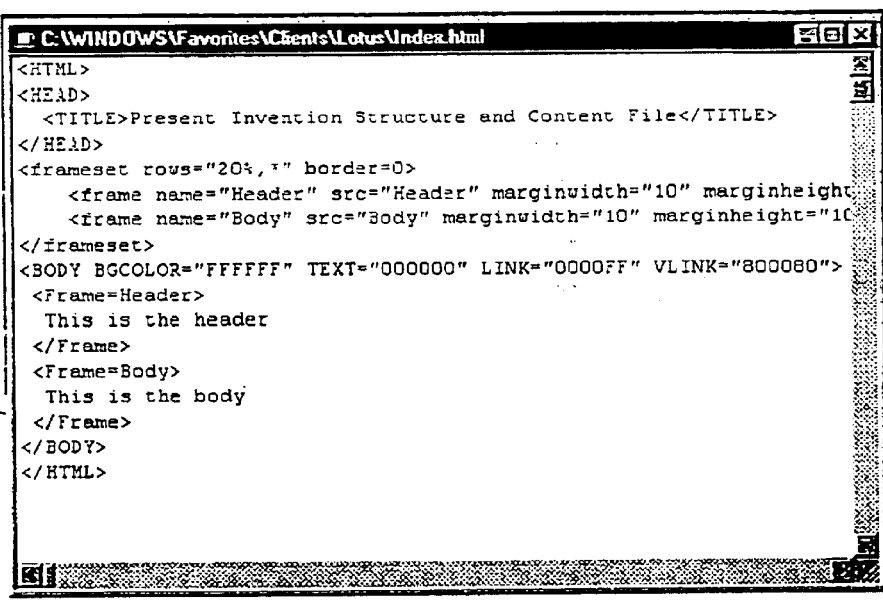
FIG. 3 is an illustration of a document management file in accordance with an embodiment of the present invention.

FIG. 3 is an illustration of the source code of a document management file 300 in accordance with an embodiment of the present invention. Various characteristics of the present invention may be the same as characteristics of existing systems and methods, such as the <html> tag at line 301 and the <head> tag at line 302. In a preferred embodiment, the present system may provide the source for the frameset in the same document management file as the frame structure. For example, in line 306, the system may extract the content of the header source from lines 310 to 312 of the same file. Similarly, the system may extract the content of the body source from lines 313 to 315.

In addition to providing content for the regions in a single file, as shown in FIG. 3, the system may also associate various attributes with the content. For example, in addition to associating the text "This is the header" with the header source, the system may also associate various attributes such as character formatting (font size, default language or color), region formatting (background color, default language or default character formatting), other attributes associated with text or regions, or a combination thereof. For example, a document may have one region that has a default language of Japanese, a white background, and black text, and a second region that has a default language of English, a black background, and white text.

In a preferred embodiment, additional functional attributes may be associated with a region. For example, an "input" attribute may create an input field in a particular field, while an "email address" attribute may identify the region as containing at least one email address. These function attributes may have default format attributes associated with them. For example, an "email address" attribute may have a predetermined color and underlining attribute associated with. An example of a function associated with an "email address" function attribute is that when a positional indicator comes into a predetermined relationship with a region, the cursor may change appearance and allow a user to create an email addressed to a particular email address. This functionality may be similar to the functionality of an HTML "mailto" tag (<A HREF="mailto:mike@lotus.com">Mike</A>).

Figures 4, 5:
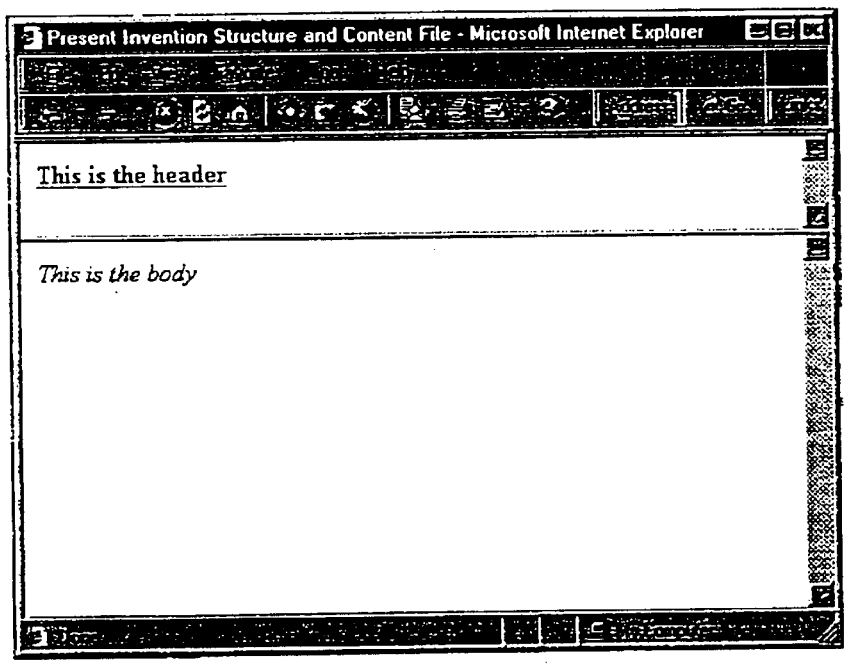
FIG. 4 is an illustration of a document management table in accordance with another embodiment of the present invention.
FIG. 5 is an illustration of a document rendered from the source code of FIG. 4.

FIG. 4 is an illustration of a document management table 400 in accordance with another embodiment of the present invention. Specifically, FIG. 4 is an example of implementing the independent formatting of regions through the use of tables. Row 410 may provide a description of or name for the type of information provided by each column. Each of the other rows (Row 420 and 430) may provide a different record to which the information relates, whereas each of the columns may indicate a different type of attribute information that is being provided by the source code.

For example, Column 401 may specify a name for a region or record. Column 402 may provide the content of the record. Column 403 may provide the character attributes of the record. Each of the fields may provide information that establishes how a document is rendered at a terminal device. For example, field 421 provides the information that the record is named "header," while field 422 provides the information that the content is "This is the header". In a preferred embodiment, a document management table 400 may have region attributes associated with a name. For example, a record named "header" may be placed at the top of a document covering 20% of a screen when rendered whereas a region named "body" may be placed at the bottom of the document covering the remaining 80% of a screen when rendered. Such region attribute defaults may be overridden by specifying new attributes in an attribute field. Additionally, if there is no default region attribute, any attribute relating to a record may be placed in an attribute field associated with the record.

Additional rows, columns and fields may be provided. Furthermore, other methods of assigning attributes may be utilized, such as drop-down boxes, check boxes, or other attribute selection methods. In a preferred embodiment, the information provided in each of the fields may be linked information. For example, if a document is going to display the telephone number of a person associated with a document, a link to the person's telephone number may be provided in Column 404. A record may contain a link to another document or database that contains the information that is to be rendered when the base document is rendered.

FIG. 5 is an illustration of a document rendered from the source code of FIG. 4. Specifically, the content and the attributes associated with each of the records is applied to the document. In a preferred embodiment, the source code of FIG. 4 may be translated at a server prior to being transmitted over a network. For example, a first server may read the source code of FIG. 4, translate it into another language, such as HTML, and deliver it across a network. For this embodiment, the system may develop a plurality of documents from the original document management table 400 prior to transmitting the document across the network in order to comply with the formatting requirements of a receiving device. In another embodiment, the source code of FIG. 4 may be translated to HTML or other language once the document has been created. Furthermore, in another embodiment, the web browser or other application that is being used to render the document may translate the source code of FIG. 4 directly to render a document as shown in FIG. 5.

In terms of network processing, in the practice of the invention the reading of the document management file 300 is preferably carried out by a client workstation or other communication device (not shown) connected to a server over any available communications link, such as dial-up modem, Ethernet, T1 or T3 lines, ISDN connections or others. The client workstation may be a personal computer running Microsoft Windows™ 95, 98 or NT™; a Unix or Linux workstation; a Web appliance such as Sony WebTV™; or other computing or communication devices. The document is physically transmitted from the server to the client workstation at login, upon request by the remote user or at other times.

The adjustments to the configuration of the email document can be done by a systems administrator at the server, or by the user at the client computer for local use or uploading. The records and attributes of document management file 300 can be coded using conventional languages such C++ or Java, or using special purpose markup languages directed to formatting of the resulting electronic document. Regardless of the specific type of document presented, in the invention not only are all governing attributes stored in a single file but any region and attribute in a region can be freely programmed, resulting in a fully modifiable document structure. In a preferred embodiment, none of the regions of the document are hardwired to a format that can not be adapted.

The foregoing description of the system and method of the invention is illustrative, and variations in configuration and implementation will occur to persons skilled in the art. For instance, while the invention has been described with respect to an email document broken down into the two main portions of a header and body, in practice any electronic document can be prepared and processed using the invention. An electronic document generated according to the invention can be decomposed into any number of regions in arbitrary configuration. For instance, a document with 10, 20 or any other number of regions could be created. The scope of the invention is intended to be limited only by the following claims.

What is claimed is:

1. A method of composing an electronic document, comprising the steps of:
   generating a file comprising:
      structure information for creating at least two independently formattable regions within the electronic document, wherein the structure information defines at least an arrangement of the at least two independently formattable regions within a frameset; and
      content for each of the at least two independently formattable regions within the frameset; and
   enabling a document management file to present the electronic document by accessing the file having both the structure information and the content so that the document management file does not need to access more than one file to present the electronic document.

2. The method of claim 1, wherein each of the at least two independently formattable regions is associated with pre-selected content.

3. The method of claim 1 further comprising, storing attribute information, wherein the attribute information and the content are associated with corresponding structure information.

4. The method of claim 3, wherein the attribute information comprises at least one of highlighting, bolding, underlining, italicizing, a default language, and a background color.

5. The method of claim 3, wherein each of the at least two independently formattable regions is associated with at least one of pre-selected content and pre-selected attribute information.

6. The method of claim 3, wherein at least one of the independently formattable regions is associated with a combination of pre-selected content and pre-selected attribute information.

7. The method of claim 3, wherein at least one of the independently formattable regions corresponds to a header of an email message, and at least another of the independently formattable regions corresponds to a body of an email message.

8. The method of claim 3, wherein the structure information, the content, and the attribute information are contained within the document management file.

9. The method of claim 3, wherein the structure information, the content, and the attribute information are contained in a document management table.

10. The method of claim 9, wherein the document management table is translated into a standardized markup language prior to transmission of the document across a network.

11. The method of claim 3, wherein at least one of the independently formattable regions is associated with a predetermined name and at least one region default attribute.

12. The method of claim 11, wherein the at least one region default attribute is capable of being overridden.

13. The method of claim 3 further comprising translating the electronic document into a plurality of HTML documents.

14. The method of claim 3 wherein at least one of the content and the attribute information is linked information.

15. The method of claim 3 wherein the attribute information comprises a functional attribute.

16. A system for processing an electronic document, comprising:
   a storage unit for storing, in a single file, structure information for creating at least two independently formattable regions within the electronic document, content that corresponds to each of the at least two independently formattable regions of the electronic document, and attribute information of the electronic document, wherein the structure information defines at least an arrangement of the at least two independently formattable regions within a frameset; and
   a processor unit, wherein the processor unit is adapted to associate at least the attribute information and the content with corresponding structure information, and wherein the processor unit enables a document management file to present the electronic document by accessing the single file having the structure information, the content and the attribute information so that the document management file does not need to access more than one file to present the electronic document.

17. The system of claim 16, wherein the attribute information governs format of each of the at least two independently formattable regions.

18. The system of claim 17, wherein the attribute information further governs a functionality associated with a selected independently formattable region.

19. The system of claim 16, wherein the processor unit translates the structure information, the content, and the attribute information, stored in the single file, into at least two documents prior to transmitting each of the documents across a network.

20. A computer readable medium having computer readable program code embodied therein for storing an electronic document, the computer readable program code comprising:
   computer readable program for generating a file that includes structure information for creating at least two independently formattable regions within the electronic document, wherein the structure information defines an arrangement of the at least two independently formattable regions within a frameset;
   computer readable program for associating, within the file, attribute information and content for each of the independently formattable regions; and
   computer readable program for enabling a document management file to present the electronic document by accessing the file having the structure information, the attribute information and the content so that the document management file does not need to access more than one file to present the electronic document.

21. The computer readable medium of claim 20, wherein the attribute information comprises functional attribute information.

22. The computer readable medium of claim 20, wherein the structure information, the content, and the attribute information are stored in a document management table.

23. A system for processing an electronic document, comprising:
   storage unit means for storing, in a file, structure information for creating at least two independently formattable regions within the electronic document, content corresponding to each of the at least two independently formattable regions in the electronic document, and attribute information of the electronic document, wherein the structure information defines at least an arrangement of the at least two independently formattable regions within a frameset; and
   processor unit means for associating at least the attribute information and the content with corresponding structure information, and wherein the processor unit means enables a document management file to present the electronic document by accessing the file having the structure information, the attribute information and the content so that the document management file does not need to access more than one file to present the electronic document.

24. The system of claim 23, wherein the attributes information governs a format of each of the independently formattable regions.

25. The system of claim 24, wherein the attribute information further governs a functionality associated with a selected independently formattable region.

26. The system of claim 23, wherein the processor unit means translates the structure information, the content, and the attribute information, stored in the file, into at least two documents prior to transmitting each of the documents across a network.

27. A method of composing an electronic document that is generated by a word processing application, comprising the steps of:
   generating a file for the word processing application, comprising:
      structure information for creating at least two independently formattable regions within the electronic document, wherein the structure information defines at least an arrangement of the at least two independently formattable regions; and content for each of the at least two independently formattable regions; and enabling a document management file to present the electronic document by accessing the file having both the structure information and the content so that the document management file does not need to access more than one file to present the electronic document.

28. A method of composing an electronic document that is generated by an electronic mail application, comprising the steps of:

generating a file for the electronic mail application, comprising:

structure information for creating at least two independently formattable regions within the electronic document, wherein the structure information defines at least an arrangement of the at least two independently formattable regions including at least a header portion and a body portion; and content for each of the at least two independently formattable regions; and enabling a document management file to present the electronic document by accessing the file having both the structure information and the content so that the document management file does not need to access more than one file to present the electronic document.

29. A method of composing an electronic document that is generated by a web browser application, comprising the steps of:

generating a file for the web browser application, comprising:

structure information for creating at least two independently formattable regions within the electronic document, wherein the structure information defines at least an arrangement of the at least two independently formattable regions within a frameset; and content for each of the at least two independently formattable regions within the frameset; and enabling a document management file to present the electronic document by accessing the file having both the structure information and the content so that the document management file does not need to access more than one file to present the electronic document.

* * * * *